United States Patent [19]

Wong

[11] 3,843,786

[45] Oct. 22, 1974

[54] METHOD OF CONTROLLING HUMAN APPETITE

[75] Inventor: Gin O. Wong, Carson, Calif.

[73] Assignee: Purex Corporation, Lakewood, Calif.

[22] Filed: Nov. 5, 1973

[21] Appl. No.: 412,682

[52] U.S. Cl. ............................................. 424/180
[51] Int. Cl. ......................... A01n 9/00, A01n 9/28
[58] Field of Search .................................... 424/180

[56] References Cited
UNITED STATES PATENTS

| | | | |
|---|---|---|---|
| 2,714,083 | 7/1955 | Ferguson | 424/180 |
| 2,952,548 | 9/1960 | Work | 424/180 |
| 3,143,463 | 8/1964 | Holm et al. | 424/180 |

OTHER PUBLICATIONS

"Food Technology," Vol. 25, No. 476, May 1971, by Rocks.

*Primary Examiner*—Elbert L. Roberts
*Attorney, Agent, or Firm*—H. Calvin White

[57] ABSTRACT

Method of controlling human appetite by ingestion of milligram amounts of xanthan gum with water, approximately one-half hour before normal mealtimes.

5 Claims, No Drawings

METHOD OF CONTROLLING HUMAN APPETITE

BACKGROUND OF THE INVENTION

This invention has to do with method of controlling human appetite, i.e., the control of the desire to eat, and more particularly is concerned with the timed ingestion of a certain hydrophyllic colloid and liquid to control appetite.

It is a major objective of the present invention to provide a method of controlling the appetite to enable successful dieting. It is another objective to provide simple means for the dieter to control the body signals leading to the feeling of a sense of hunger. It is another objective to provide in capsule form an adjunct to a dieting program which when ingested at recommended times in recommended dosages will curb the feeling of hunger.

SUMMARY OF THE INVENTION

It has been discovered that human appetite may be controlled and food intake thereby reduced without spartan diet regimes by the method which generally includes ingesting orally from 10 to 60 minutes prior to mealtime from 500 to 4,000 milligrams of xanthan gum with from 3 to 12 ounces of liquid, such as water.

DETAILED DESCRIPTION

Xanthan gum is a complex polysaccharide having a molecular weight above about one million. A suitable form for use in the present invention is a commercial product sold under the trademark Keltrol by Kelco Company of Clark, New Jersey. As described in their literature DB No. 18 Keltrol is xanthan gum, a high molecular weight linear polysaccharide, designed particularly for food, drug and cosmetic uses which functions as a hydrophilic colloid to thicken, suspend, emulsify and stabilize water based systems. More specifically Keltrol is described as being linear in structure with B-linked backbone containing D-glucose, D-mannose and D-glucuronic acid with 1 D-mannose side-chain unit for every 8 sugar residues and 1 D-glucose side chain residue for every 16 sugar residues. The gum is partially acetylated and contains pyruvic acid attached to the glucose side chain residue. The molar ratio of D-glucose to D-mannose to D-glucuronic acid is 2.8:30:2.0. Further details of the nature and preparation of the xanthan gum may be noted from U.S. Pat. No. 3,694,236 issued Sept. 26, 1972 to Edlin, and U.S. Pat. No. 3,708,446 issued Jan. 2, 1973 to Pettitt which are hereby incorporated by reference. Additionally, the article "Xanthan Gum" appearing in Food Technology Vol. 24 476 May, 1971, is incorporated by reference herein.

Despite the numerous suggestions in the references noted that xanthan gum is a useful additive for foods, it has not heretofore been discovered that the gum per se taken well before meals and without food will act to suppress the appetite, perhaps through a bulking phenomenon which possibly causes a signal of satiety, diminishing the desire for further food intake. Other rationales may be proposed for the effectiveness of the method herein disclosed and of course I do not wish to be bound to any particular theory, since the bodily mechanisims involved are but imperfectly understood at this time.

EXAMPLES

Capsules were prepared from a powder mixture of Vitamins A, $B_1$, $B_2$, C, E, & $B_{12}$, and niacinamide, ferrous sulfate, and 97 per cent by weight Keltrol brand xanthan gum. Each filled capsule weighed approximately 667 milligrams and contained on average 567 milligrams of the powder mixture of which 550 milligrams is xanthan gum. The vitamins and their mixture with xanthan gum do not constitute a part of the present invention per se, but are used to supplement the user's diet as a protection against vitamin deficiency possibly incurred through reduced food intake caused by the effectiveness of the xanthan gum.

The above capsules are to be used two before each meal and preferably as an adjunct to a reduced caloric intake diet. Accordingly, in demonstration of the effectiveness of the present method, a study group of 30 individuals who had expressed a commitment to lose weight in a prestudy interview, had been medically examined and found to be psychologically suited for a weight reduction program. Twenty participants were given the capsules containing 550 milligrams of xanthan gum divided into Y group of 10 who were also placed on a fixed low calorie (1,000–1,200 per day) diet, and an X group of 10 who were given no numerical dietary restriction but encouraged to limit calories. A Z group of 10 was given a placebo and requested like the Y group to limit calorie intake to 1,000 to 1,200 calories per day.

The test was made over an eight week period. Each participant was given a set of menus to follow and instructed to take two capsules with 8 ounces of water between 20 and 30 minutes before mealtimes. Results were as follows:

|  | Group Designations | | |
|---|---|---|---|
|  | X | Y | Z |
| Number of Patients | 10 | 10 | 10 |
| Number Completed 8 Weeks | 7 | 6 | 4 |
| Average Pounds Weight Loss or Gain | −5.6 | +1.0 | +1.8 |
| Projected Average Loss or Gain for 8 Week Period | −5.9 | +1.5 | +3.4 |
| Average Pounds Loss or Gain/Wk (Projected 8 Wks) | −0.75 | +0.2 | +0.4 |
| Number Treatment Successes | 5 | 2 | 1 |
| Number Treatment Failures | 5 | 8 | 9 |

X = Treatment with no set caloric intake
Y = Treatment with 1200 calorie restriction
Z = No Treatment: 1200 calorie restriction plus placebo.

The data presented shows that the group X which was given the xanthan gum product but no fixed calorie level, did better in terms of number of successes and weight lost than the Y group which received the same xanthan gum product but had a fixed number of calories to consume. Both groups did better than the control group Y. It may be inferred from the data that the X group, not obliged to take in a fixed number of calories, actually consumed fewer calorific foods and thus lost weight, owing to the effectiveness of the xanthan gum as an appetite suppressant, and the absence of any requirement to consume a fixed level of calories.

The xanthan gum can be taken alone but as noted vitamin supplementation is desirable in a commercial product. Time of taking may be varied to between 10 and 60 minutes before mealtimes and is preferably 20 to 30 minutes before, or at other times when a snack urge is felt. The quantity of liquid, preferably water but possibly juice, tea, coffee, diet soda, or the like may range between 3 and 12 ounces and is preferably 8 ounces. The intake of xanthan gum per taking should be between 500 and 4,000 milligrams, suitably 500 to 1,200 milligrams per dose; with 1,100 milligrams being preferred.

It may further be observed that various agents theoretically capable of bulking in the body to induce sensation of satiety, e.g., guar gum, methyl cellulose, sodium alginate and plantago seed (psyllium mucilloid) at the range of pH encountered in the gastric and intestinal fluids i.e., 1.2 and 7.6 respectively have a constant, low to moderate viscosity at concentrations of 1.1 gram per 240 millileters of water, i.e., less than 40 centipoises through this pH range (Brookfield viscometer, spindle No. 1 and 10 RPM) for sodium alginate, methyl cellulose and plantago seed and not more than 328 centipoises for guar (same conditions). Xanthan gum on the other hand at pH 1.2 had a viscosity of 744 (same conditions) which increased to 1,360 centipoises at pH 7.5, or far above comparable values for the other materials noted. While the connection of viscosity data with product effectiveness is not readily made, methyl cellulose at least has been proposed as an appetite suppressant, and criticized as ineffective and the difference in effectiveness between xanthan gum and e.g., methyl cellulose, may be their radically different viscosity properties at the pH levels of interest.

I claim:

1. Method of controlling human appetite which consists essentially of ingesting orally from 10 to 60 minutes prior to mealtime from 500 to 4,000 milligrams of xanthan gum with from 3 to 12 ounces of liquid.

2. Method according to claim 1 in which from 500 to 1,200 milligrams of xanthan gum is ingested.

3. Method according to claim 1 in which the Xanthan gum is ingested from 20 to 30 minutes prior to mealtime.

4. Method according to claim 1 in which said liquid is water.

5. Method according to claim 1 in which from about 1,100 milligrams of xanthan gum are ingested from 20 to 30 minutes prior to mealtime and with 8 ounces of water.

* * * * *